W. HEINLE.
BUNG-EXTRACTOR.
No. 175,351. Patented March 28, 1876.
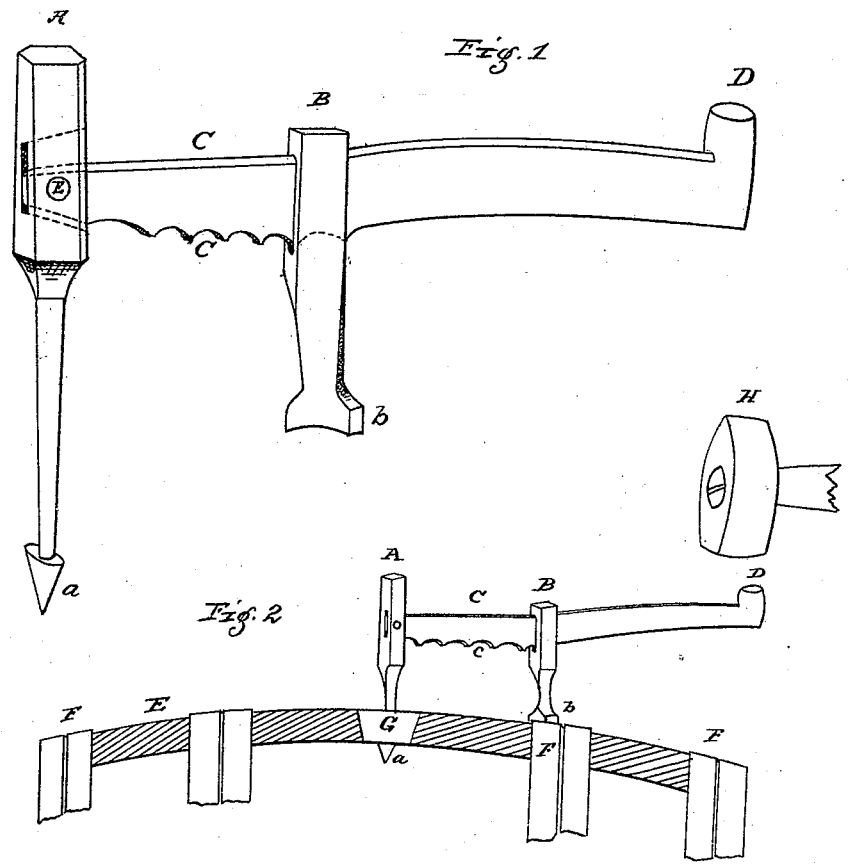

UNITED STATES PATENT OFFICE.

WILLIAM HEINLE, OF LANCASTER, PENNSYLVANIA.

IMPROVEMENT IN BUNG-EXTRACTORS.

Specification forming part of Letters Patent No. 175,351, dated March 28, 1876; application filed February 17, 1876.

*To all whom it may concern:*

Be it known that I, WILLIAM HEINLE, of the city of Lancaster, in the county of Lancaster and State of Pennsylvania, have invented certain Improvements in an Implement for Extracting Bungs, of which the following is a specification:

My invention is calculated for extracting the ordinary solid bungs driven even with the upper surface into kegs and barrels, or when projecting, without first boring or perforating the bung, or using such perforated bungs in kegs made previous to the application of the implement for said purpose of extraction.

The accompanying drawings clearly show the construction and application of my device, which, with the letters of reference marked thereon and a brief description, will enable those skilled in the art to make and use the same, and in which—

Figure 1 shows the headed and barbed stem, fulcrum, and lever; and Fig. 2, the application in use, ready to extract the bung.

The square (or rounded) head A has a slot, beveled in the upper and lower edge, so as to allow vertical play to the lever-arm C, secured at one end in said slot by a stout pivot. This head A has a stem, slightly tapering, of the desired length, terminated by an acute triangular head, *a*, having cutting-edges, and the projecting base of the triangle square out on each side. The lever-arm C has scalloped or rounded notches *c* on the lower edge, which fit over the convex base of the slot in the fulcrum-head B, which slides upon the lever-arm C, in order to adjust its foot *b* to bear on the nearest (usually iron) hoop F. This lever-arm C is terminated by a raised stout head, D.

The operation is simple: The point of the barbed stem *a* is centrally set upon the bung in the cask or barrel, the lever-arm at right angles to the length of the vessel. A smart blow with a hammer will drive the barb *a* entirely through the bung, when a quarter-turn of the lever, so as to range with the top of the cask longitudinally, will now bring the projecting shoulders of the barb across the cut previously made by it, and square against the under side of the bung. The fulcrum B being adjusted, a blow on the head D of the lever extracts the bung with perfect ease and certainty, without injury to the keg or bung-hole.

I am aware that devices for extracting bungs are not new, as seen in the Patent No. 111,351, January 7, 1871, where a gravitating-dog in a rod is used by inserting through a central hole purposely prepared, or first detaching a central plug in the bung. The uncertainty and difficulty to have the so-called dog drop into position, and the necessity of using plug-bungs, or first making a perforation, is found practically too tedious. With the barb, the perforation turning a quarter-circle, a tap jerks the bung out in less time than it takes to explain.

What I claim as my invention in a bung-extractor is—

The combination of the beaded stem A, with its shouldered barb *a*, the lever-arm C, with its end head D, and the sliding or adjustable fulcrum B, with its foot *b*, the whole substantially constructed as and for the purpose specified.

WILLIAM HEINLE.

Witnesses:
  W. B. WILEY,
  JACOB STAUFFER.